United States Patent [19]

Geissbühler

[11] 4,190,230
[45] Feb. 26, 1980

[54] SCAVENGING AIR VALVE FOR CLEANING TUBULAR AIR FILTER BODIES

[75] Inventor: Hans Geissbühler, Niederuzwil, Switzerland

[73] Assignee: Gebrueder Buehler AG, Switzerland

[21] Appl. No.: 885,166

[22] Filed: Mar. 10, 1978

Related U.S. Application Data

[63] Continuation of Ser. No. 682,844, May 4, 1976, abandoned.

[30] Foreign Application Priority Data

May 5, 1975 [CH] Switzerland .................. 5783/75

[51] Int. Cl.² .............................................. F16K 31/122
[52] U.S. Cl. ......................................... 251/36; 55/302; 92/85 B; 91/405; 251/30; 251/44
[58] Field of Search ............... 55/302; 251/30, 36, 251/44, 47, 50, 52; 91/396, 405; 92/85 B, 143

[56] References Cited

U.S. PATENT DOCUMENTS

| | | | |
|---|---|---|---|
| 1,466,412 | 8/1923 | Samain | 251/36 |
| 1,874,793 | 8/1932 | Nightingale et al. | 251/50 |
| 2,373,654 | 4/1945 | Beekley et al. | 251/36 |
| 2,635,634 | 4/1953 | Thurber | 251/44 |
| 3,267,815 | 8/1966 | Ortman et al. | 92/85 B |
| 3,272,227 | 9/1966 | Williams | 251/36 |
| 3,394,532 | 7/1968 | Oetiker | 55/302 |
| 3,535,852 | 10/1970 | Hirs | 55/302 |
| 3,677,141 | 7/1972 | Lagerquist | 92/85 B |
| 3,797,367 | 3/1974 | Fujiwara et al. | 92/85 B |
| 3,816,977 | 6/1974 | Gordon et al. | 55/302 |
| 3,974,910 | 8/1976 | Papai | 91/396 |

*Primary Examiner*—Martin P. Schwadron
*Assistant Examiner*—G. L. Walton
*Attorney, Agent, or Firm*—Merchant, Gould, Smith, Edell, Welter & Schmidt

[57] ABSTRACT

A scavenging air valve for cleaning at least one tubular filter body is disclosed. The air valve has a laminar valve body, one side of which forms, by means of its inner portion, the shutoff for the inlet of a scavenging air line. Its edge zones of said one side face toward a scavenging air chamber. The valve body is movable perpendicular to the side mentioned, inside of a maintaining chamber, under the effect of the scavenging air. The maintaining chamber is, on the one hand, in constant communication with the scavenging air chamber over at least one throttling point and, on the other hand, is connected to a blockable exhaust air line through means of a control valve.

7 Claims, 6 Drawing Figures

SCAVENGING AIR VALVE FOR CLEANING TUBULAR AIR FILTER BODIES

This is a continuation of application Ser. No. 682,844, filed May 4, 1976, now abandoned.

BACKGROUND OF THE INVENTION

In one scavenging air valve of this genre that has been known for years, the valve body is structured as a rubber membrane that is clamped all around between the housing of the maintaining chamber and that of the scavenging air chamber. The valve can be used for scavenging one or several filter bodies, e.g. bag filters or sack filters. For years, air filters with this type of cleaning system have been extraordinarily successful because, thanks to the method of construction of the scavenging air valve, they can be driven with a low scavenging pressure. In the case of single bag scavenging, a maximum positive pressure of 0.5 atmospheres suffices. Hence, use of simple air seals is possible.

One disadvantage repeatedly experienced lies in the limitation of the area of application because the maximum operating temperature is limited to about 150° C. by the quality of the rubber membrane.

In another construction, the membrane is not clamped but, rather, freely movable. To close off the scavenging air opening, it clears the line used for filling the scavenging air chamber through the control valve. Therefore, this control valve must be constructed to reverse the direction of flow, and not only for shutting off the exhaust air. Its construction is expensive and its speed of response is much lower. Because the maintaining chamber is not constantly in communication with the scavenging air chamber, scavenging cannot be interrupted simply by closing the control valve at the desired point in time, rather compressed air must be introduced into the maintaining chamber through the control valve so that the scavenging air opening can once again be closed. The speed of response in this case is also lower so that the duration of the scavenging impulse is difficult to control. In order to guarantee a sufficient scavenging effect, this duration of scavenging impulse must be selected to be greater than the first type of construction, such that a considerably greater consumption of scavenging air is necessary. The operating temperature is limited in this case also.

In the case of digital, pneumatic and hydraulic control, there are known valves whose valve body is formed as a fixed disk. They have the same disadvantage as the previously described construction, in that they require a positive control pressure for closure and are not controlled simply by blocking an exhaust air line. Their use is intended primarily for hydraulic applications. Primarily, their purpose is improvement of the sealing effect and reduction in the quantity of oil leakage. Their conversion to the dimensions and to the speed of pneumatic scavenging air valves for air and gas filters is impossible because of the intolerable noise from the striking of the disk against the maintaining chamber housing.

SUMMARY OF THE INVENTION

The scavenging air valve in accordance with the invention is characterized by the fact that the valve body is a disk that displays a slight amount of play relative to the partition of the maintaining chamber, that it is guided by means of a guide that is attached to the housing of the maintaining chamber, and that it supports, on the side of the exhaust line, at least one cylinder body that is shaped for penetration into a cavity in the housing.

In this manner, I succeed in building a non-temperature sensitive scavenging air valve with simple means, which is braked at the end of its opening travel without requiring separate parts. In spite of this, lifting of the valve body occurs much faster than in the case of the previously known membrane valve, so that the scavenging air pressure can be selected to be still lower. The required scavenging air pressure is also much lower in the case of multiple bag scavenging than it is for previous type constructions.

In a particularly advantageous form of embodiment, provided as the cavity is that portion of the exhaust air line adjacent to the maintaining chamber, which, with the cylinder body, forms an interrupter for exhaust air flow. In this case, braking is accomplished by shutting off the exhaust air line by means of the valve body itself, and the air still remaining in the maintaining chamber acts as damping.

In further pursuit of this idea, the cylinder body can continuously penetrate into the exhaust air line and, with this latter, form the disk guide. It contains a connecting line which, at one end, opens into the exhaust air line and, at the other end, it can be connected with the maintaining chamber through a connecting opening arranged on the cylinder body in the neighborhood of the disk. It is possible to select the width of the connecting opening, along its axial length, to correspond to the desired braking travel.

Further, the housing of the maintaining chamber can consist predominantly of a cylindrical partition having a cover tightly joined to it which contains the cavity for accepting the cylinder body, whereby the cover serves for attachment to a wall of the scavenging air chamber, and the cylindrical partition extends into the scavenging air chamber. In this manner, the valve can be attached to the scavenging air chamber as a unit. The structural height is minimal since the maintaining chamber lies inside the scavenging air chamber.

DESCRIPTION OF THE EMBODIMENTS

Figure 1:
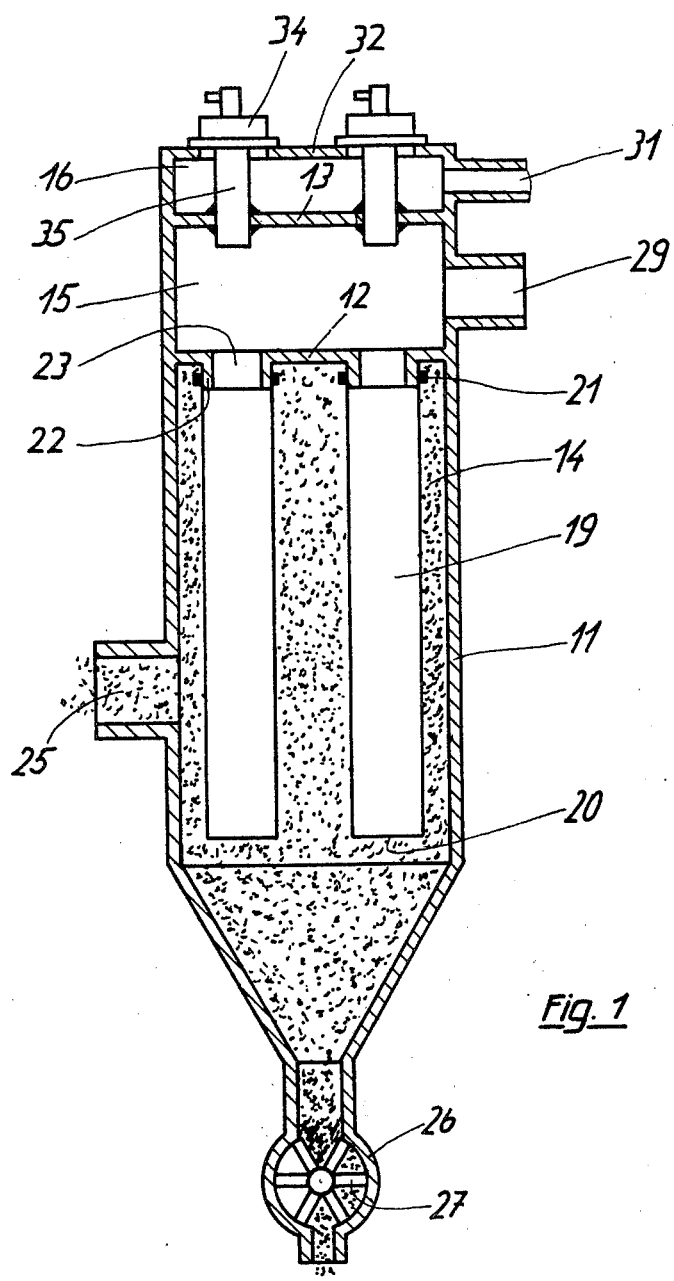
FIG. 1 is a cut through a bag filter equipped with scavenging air valves that are in accordance with the invention, for the first form of embodiment.
Figure 2:
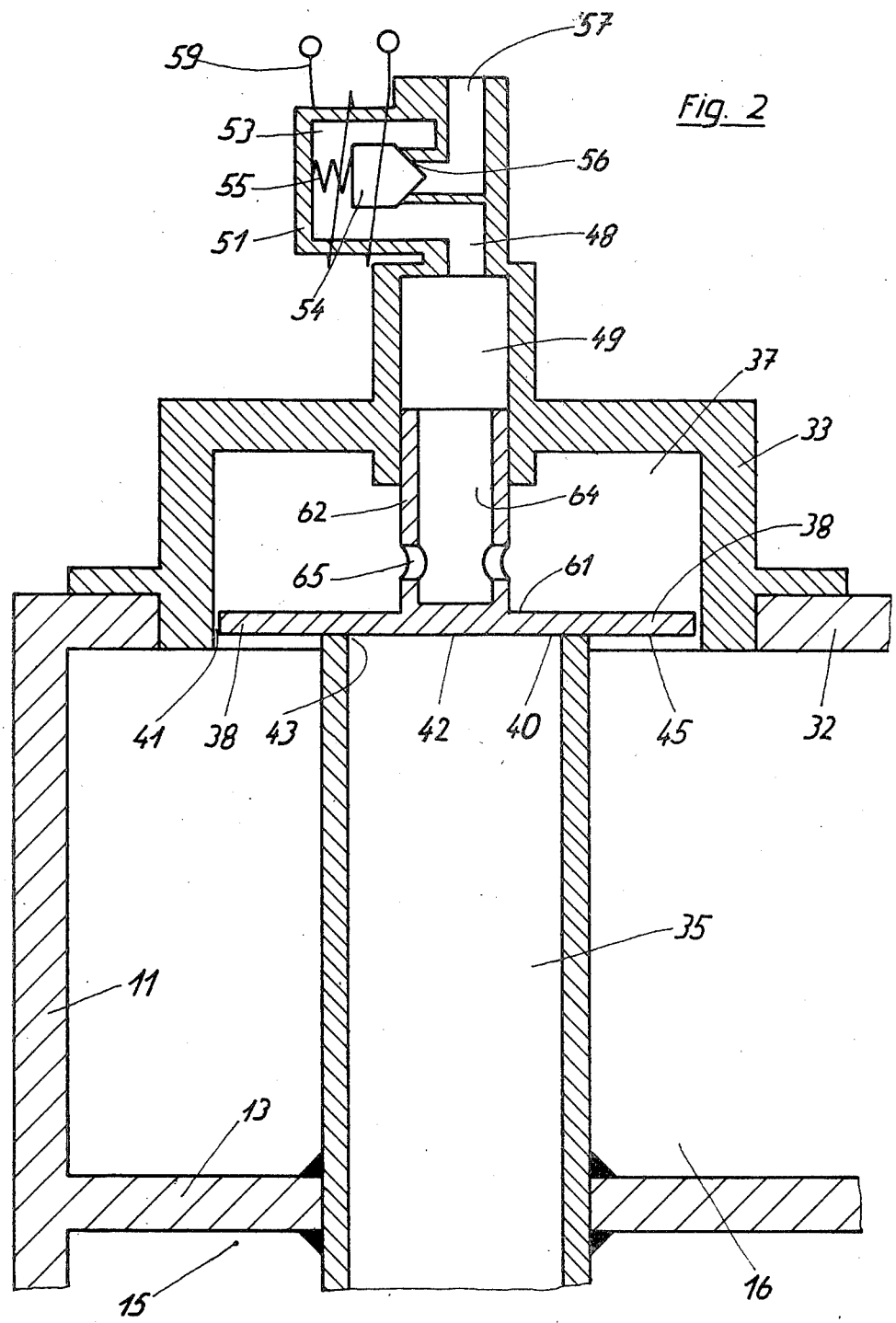
FIG. 2 shows, to a larger scale, a cut through one scavenging air valve of FIG. 1.

The housing 11 for the bag filter according to FIGS. 1 and 2 is divided by partitions 12 and 13 into a dust-laden chamber 14, a clean air chamber 15, and a scavenging air chamber 16. Arranged in the dust-laden chamber 14 are bag filters 19 that are closed off at their bottom portion 20. They are attached by means of clamps 21 to sleeves 22, which are arranged on the intermediate wall 12, and form a passageway 23 between the inside of filter bags 19 and the clean air chamber 15. A feed pipe 25 opens into the dust-laden chamber 14. This latter is provided with a discharge lock 26 containing a pocket wheel 27. An outlet pipe 29 leads out of the clean air chamber 15.

A compressed air line 31 opens into the scavenging air chamber 16. The housing 33 of the scavenging air valve 34 is attached to the top wall 32 of the scavenging air chamber 16 by means that are not shown. A scavenging air valve 34 is associated to each filter bag 19. A scavenging air line 35 that is attached to the intermediate wall 13 leads from scavenging air valve 34 into the clean air chamber 15 and opens therein at some distance from and in the direction toward the corresponding passageway 23. The housing 33 (FIG. 2) forms the maintaining chamber 37 for the valve body that is structured as a disk 38 having opposite sides and a peripheral edge. With its inner portion 42, the lower side 40 of disk 38 forms the closeoff for the inlet 43 of the scavenging air line 35, which inlet is located in the opening between the maintaining chamber 37 and the scavenging air chamber 16. At its edge areas 45, this underside 40 is turned toward and faces the scavenging air chamber 16. The disk 38 is movably arranged inside maintaining chamber 37 in the direction perpendicular to its bottom side 40. Relative to the walls of housing 33, it displays a slight amount of play-space in the form of a narrow air gap 41 which forms a throttling point, as a communication between the scavenging air chamber 16 and the maintaining chamber 37.

The maintaining chamber 37 is connected with an exhaust air line 48 that starts from a cylindrical cavity 49 of housing 33 which opens into chamber 37. The exhaust air line 48 can be closed off by a control valve 51. It leads into a chamber 53 of control valve 51 that contains a schematically represented valve body that is pressed, by means of a spring 55, in the direction of inlet 56 of a discharge line 57 that opens out into the atmosphere. An electrical coil 59 that can be energized by a control device that is not shown serves to draw back the valve body 54 and, thereby, for opening inlet 56 to the connection between exhaust air line 49 and discharge line 57.

On its top side 61, disk 38 supports a protrusion in the form of a cylinder body 62 that constantly penetrates into the cylindrical cavity 49, thus forming the guide for disk 38. The generally cylindrically shaped body or member 62 contains a communicating line or bore 64 which, on the one end opens out into the cavity 49 and which at the other end is connectable to the maintaining chamber 37 through a communicating opening 65 arranged in cylinder body 62 in the neighborhood of disk 38.

The operation is the following:

The dust-laden air is forced or drawn into the dust-laden air chamber 14, through feed pipe 25, by means of blowers that are not shown. The air penetrates to the inside of filter bags 19, while the dust, in part, lodges on the surface of these filter bags 19 or, for the most part, falls down below and is carried out of dust-laden chamber 14 by means of the continuously rotating pocket wheel 27, which serves as a seal.

The cleaned air is forced out of the inside of filter bags 19, through passageway 23, into clean air chamber 15 and leaves through outlet pipe 29.

With time, the dust deposit on the surface of filter bags 19 increases, and resistance to flow for the air to be cleaned increases. Therefore, the filter bags 19 must be cleaned from time to time. This occurs in a known manner in that the individual filter bags 19 are acted upon, shock-fashion, in a given rhythm, one after the other, by a jet of scavenging air. The scavenging air stream from the related scavenging air line 35 penetrates through passageway 23 into the inside of the filter bag 19. This latter expands outwardly and, thanks to the shock-like movement of the filtering agent, some desired portion of the deposited dust is removed and taken out downwardly. During cleaning of one of the filter bags 19, the other filter bags 19 continue their filtering operation so that no interruption of operation occurs.

During filtering operation of the filter bag 19 concerned, coil 59 (FIG. 2) is de-energized. The maintaining chamber 37 remains in continuous communication with the scavenging air chamber 16 through means of the annular-shaped, slight play-space 41, so that the same pressure as in compressed air line 31 reigns in both chambers.

The scavenging air under stress penetrates through the communicating opening 65, the connecting line 64, the cavity 49, and the exhaust line 48 on into chamber 53. It contributes to closure of valve body 54. Because the top side 61 of disk 38 has a greater area than the edge zones 45 of its bottom side 40, disk 38 is pressed with great force against inlet 43 of scavenging air line 35 which is thereby tightly closed.

When the filter bag 19 under consideration must be cleaned, the control device that is not shown energizes coil 59, which draws back valve body 54 against the force of spring 55 and the pressure of the compressed air that is in chamber 53. The compressed air in the maintaining chamber 37 can escape, impact-fashion, through the communicating opening 65, the connecting line 64, the cavity 49, the exhaust line 48 and discharge line 57. Therefore, the pressure in the maintaining chamber 37 drops and the pressure of the scavenging air on the edge zones 45 of the bottom side of disk 38 raises said disk 38, impact-fashion, until communicating opening 65 arrives inside of cavity 49. By closure of the communicating opening 65 obtained in this fashion, the air remaining in the maintaining chamber 37 is prevented from escaping through the exhaust line 48 so that it exercises an impact damping effect on disk 38, preventing said disk 38 striking against housing 33 with a loud noise. The shape of the communicating opening 65 can be adapted to achieve a desired braking travel for disk 38.

The scavenging air flows impact-fashion out of the scavenging air chamber 16, on past disk 38, through inlet 43 into scavenging air line 35, and from here on into the inside of filter bags 19, as described above.

After a short time, the control device cuts off the current in coil 59. The spring pushes the valve body 54 against the inlet 56 of the discharge line 57 so that the exhaust line 48 is closed off. With flow of scavenging air out of chamber 16 through the annular-shaped play-space 41, the pressure in the maintaining chamber 37 again increases so that disk 38 is pushed downwardly and again closes off inlet 43. It can be remarked that, in case of a long-lasting scavenging, which is not desirable because of the increased consumption of compressed air, the pressure in the maintaining chamber 37 again increases because of the communicating opening 65, and presses disk 38 downwardly. However, as soon as the communicating opening 65 is again opened, the air can again escape out of the maintaining chamber 37 through the discharge line 57 so that disk 38 hunts a position of equilibrium.

Figure 3:
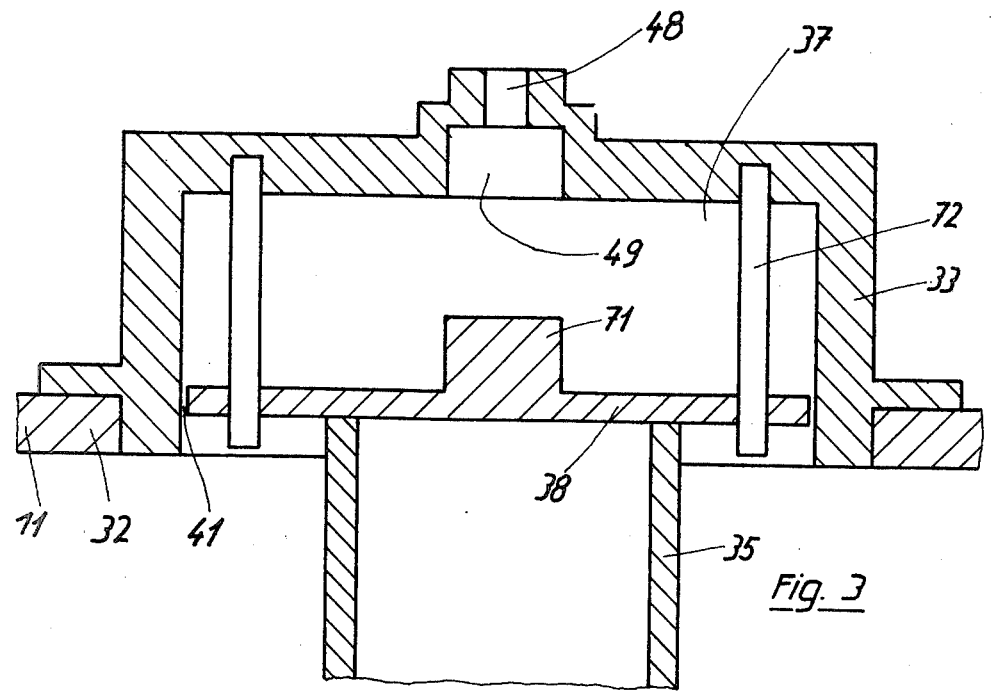
FIG. 3 shows the second form of embodiment of the scavenging air valve in a cut corresponding to that of FIG. 2.

In the form of embodiment in FIG. 3, disk 38 supports a simple, short cylinder 71 which, in the closed position of disk 38, does not quite reach into cavity 49. Used for guidance of disk 38 are pins 72 that are attached to housing 33.

With the opening movement of disk 38, cylinder 71 and cavity 49 form an interrupter to the flow in the exhaust line 48.

Figure 4:
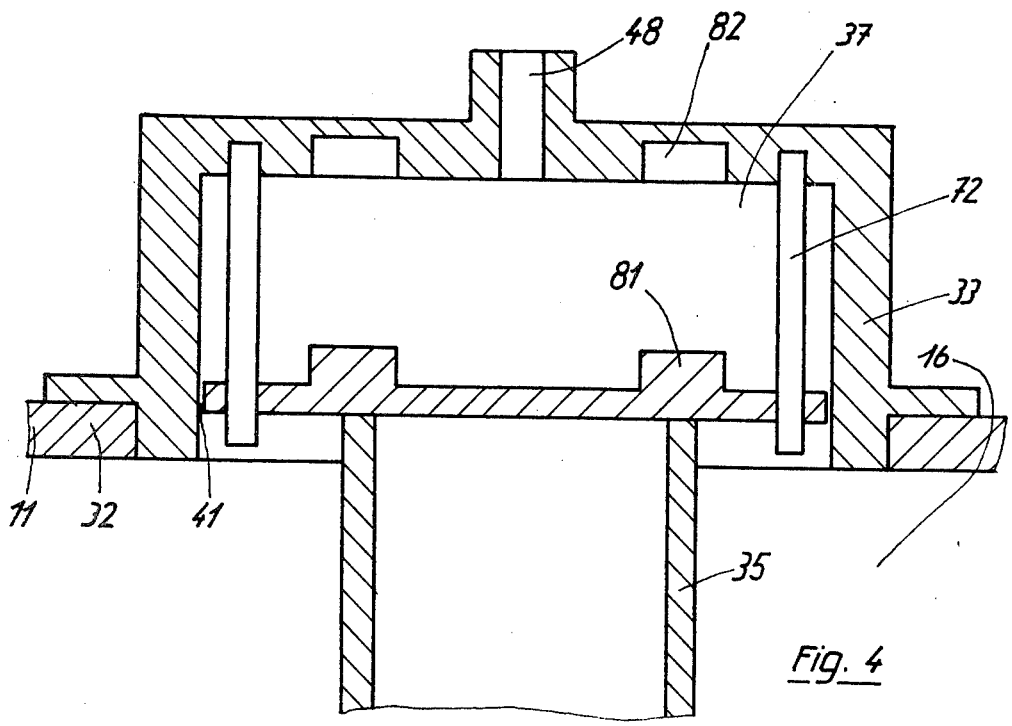
FIG. 4 shows the third form of embodiment of the scavenging air valve in a cut corresponding to that of FIG. 2.

In the form of embodiment of FIG. 4, the portion of the exhaust line 48 adjacent to maintaining chamber 37 is no longer used as a cavity. Separate cavities 82 are provided, which are structured as dead ends.

Disk 38 supports cylinders 81 which penetrate into cavities 82 at the end of opening travel. Thnaks to the air that is trapped in cavities 82, cylinders 81, along with cavities 82, form shock absorbers.

Figure 5:
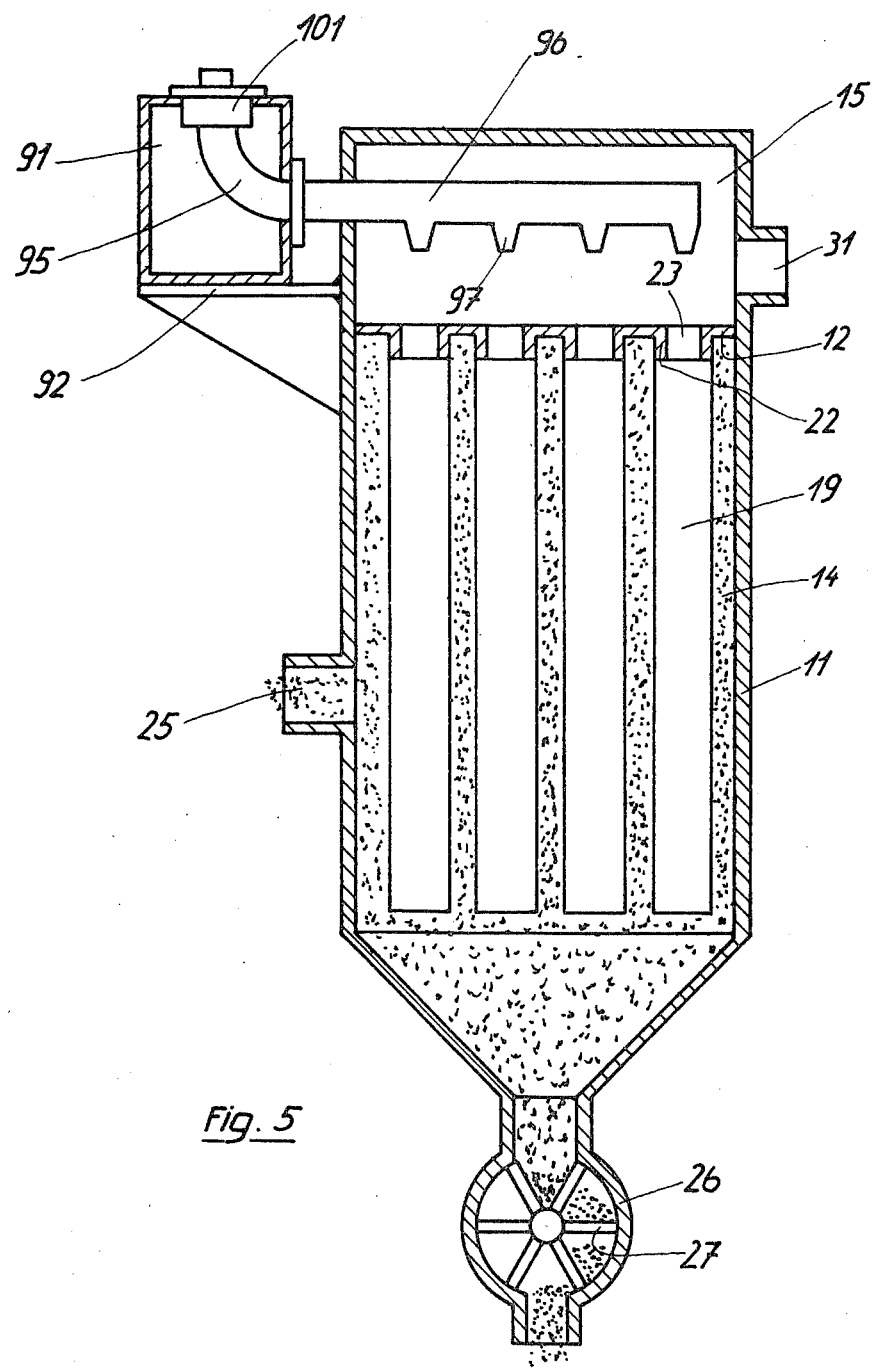
FIG. 5 shows a cut through a bag filter equipped with a scavenging air valve of the fourth form of embodiment.
Figure 6:
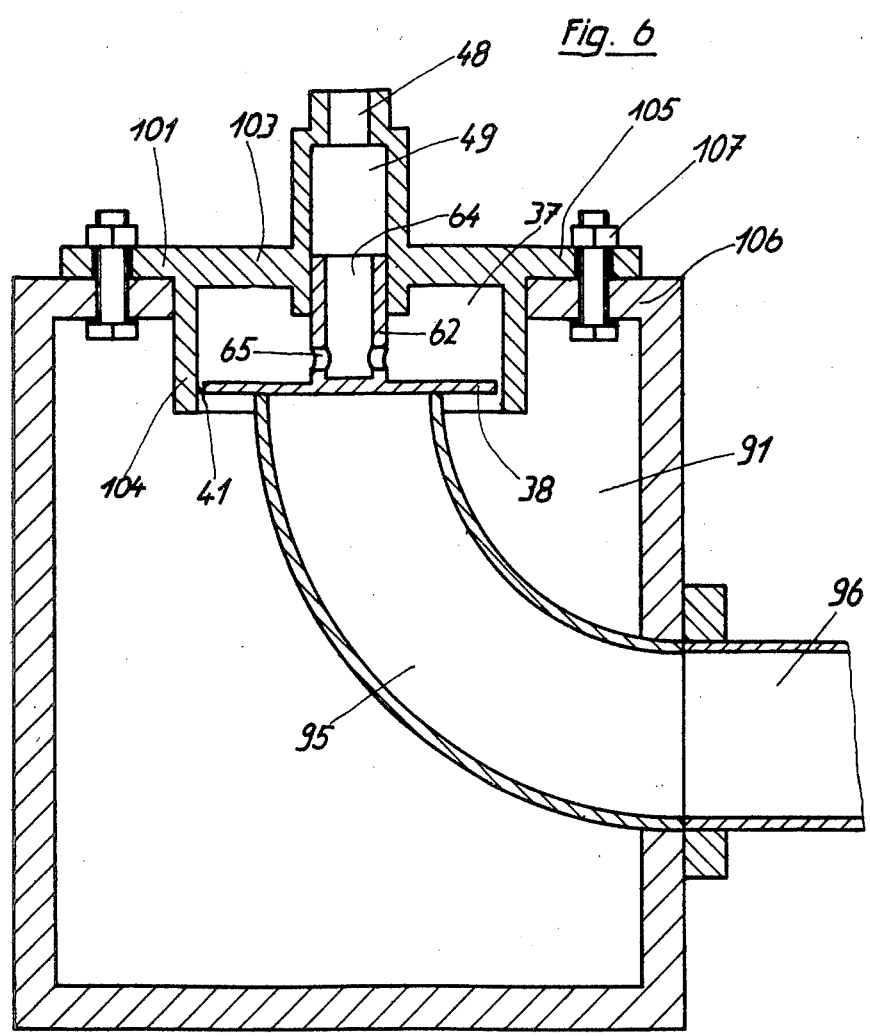
FIG. 6 shows, to a larger scale, a cut through one scavenging air valve of FIG. 5.

In the form of embodiment of FIGS. 5 and 6, housing 11 does not contain any scavenging air chamber. A separate scavenging air chamber 91 is arranged on a support bracket 92 on the side of the filter housing. A scavenging air line 95 opens out into a distributor pipe 96 that extends into the clean air chamber 15, and is provided with nozzles 97 for the simultaneous cleaning of a whole series of filter bags 19. It is self-understood that several series of filter bags 19 are arranged one behind the other in the dust-laden chamber 14, so that the scavenging air chamber 91 extends, over a certain length, in a direction perpendicular to the plane of the drawing.

Construction and operation of scavenging air valve 101 correspond in great measure to those of the form of embodiment of FIGS. 1 and 2 where, as in FIGS. 3 and 4, the control valve for closing off the exhaust line 48 is not shown. The housing 103 of the maintaining chamber 37 consists predominantly of a cylindrical partition 104 and a cover 105 that is tightly joined to this latter, said cover containing the cavity 49 for accepting cylinder body 62. The cover 105 serves for attachment, through means of bolts 107, to the top wall of the scavenging air chamber 91, and the cylindrical partition 104 penetrates into the scavenging air chamber 91. This method of construction permits simple mounting and an economy of structural height, because the maintaining chamber 37 is, for the most part, arranged inside the scavenging air chamber 91.

What is claimed is:

1. A high speed low pressure scavenging air valve for cleaning at least one tubular filter body by selectively introducing pulses of scavenging air from a scavenging air chamber to said tubular body comprising:
   (a) a housing having stationary inner side walls, a stationary end wall connected to said side walls, and an exhaust port through said end wall, a maintaining chamber being defined between said inner walls and said end wall;
   (b) a scavenging air line having an inlet end disposed within said maintaining chamber, said inlet end having a first transverse dimension;
   (c) a valve disc formed of rigid material having first and second sides, and a central portion, said first side being exposed to said scavenging air chamber, said second side being exposed to said maintaining chamber, said central portion being disposed to selectively open and close said inlet end of said scavenging air line, said first and second sides extending substantially beyond the first transverse dimension of said inlet end of said air line to provide a pressure surface on the first side of said disc for said scavenging air to move said disc away from said inlet end, said disc being mounted for reciprocating movement within said maintaining chamber in a direction normal to said disc, said second side forming a second pressure surface opposite said stationary end wall for scavenging air in said maintaining chamber to move said disc toward said inlet end, said first and second sides having outer edge portions, said outer edge portions and said inner side wall of said maintaining chamber defining a narrow throttling passageway which provides fluid communication between said scavenging air chamber and said maintaining chamber;
   (d) means for guiding said disc in said maintaining chamber;
   (e) an exhaust air line in fluid communication with said exhaust port;
   (f) a control valve positioned within said exhaust line to regulate the flow of air therethrough, said valve normally blocking the flow of air whereby said disc is normally biased to close said inlet end by the pressure of scavenging air within said maintaining chamber on the second pressure surface of said second side, and whereby when said control valve is open, said pressure in said maintaining chamber is released and said scavenging air pressure acting against said first side of said disc rapidly opens said inlet end of said scavenging air line introducing a scavenging air pulse into said air line; and
   (g) means for pneumatically damping said disc in its movement toward said end wall to open said inlet end whereby said disc rapidly closes said inlet end to terminate said scavenging air pulse, said pneumatic damping means being inoperative to dampen said disc movement upon initial rapid opening of said air inlet end and operative to dampen said disc movement only as said disc approaches said end wall of said maintaining chamber.

2. A scavenging air valve in accordance with claim 1 wherein said pneumatic dampening means includes a cavity formed in said end wall and a member extending from the second side of said disc positioned for penetration in sliding movement into said cavity.

3. A scavenging air valve in accordance with claim 2 wherein said cavity is a portion of said exhaust air line adjacent to said maintaining chamber, and wherein said member is a cylinder body that with said cavity forms an interrupter for exhaust air flow.

4. A scavenging air valve in accordance with claim 3 wherein said cylinder body continuously penetrates into said exhaust air line, said cylinder body and said exhaust air line forming said guiding means for said disc, and wherein said cylinder body contains a communicating line which at one of its ends opens into said exhaust air line and at its other end is connected in fluid communication to said maintaining chamber through a connecting opening formed through said cylinder body approximate said disc, whereby upon movement of said disc towards said end wall said opening becomes positioned within said cavity in said housing thereby blocking the flow of air from said maintaining chamber into said exhaust air line thus providing a cushion of air between said valve disc and said end wall.

5. A scavenging air valve in accordance with claim 2 wherein said housing of the maintaining chamber is comprised predominantly of a cylinder partition having a cover which contains said cavity for accepting said member, whereby the cover serves for attachment to a wall of the scavenging air chamber and said cylinder partition extends into the scavenging air chamber.

6. A scavenging air valve in accordance with claim 2 wherein said cavity is structured as a dead end and wherein said member forms a pneumatic impact damper.

7. A scavenging air valve in accordance with claim 6 wherein said guiding means includes a plurality of pins extending from said end wall, said disc having a plurality of openings for slidingly receiving said pins, and wherein said damping means includes a plurality of said cavities and a plurality of said members.

* * * * *